(12) United States Patent
Maynard

(10) Patent No.: US 10,632,568 B2
(45) Date of Patent: Apr. 28, 2020

(54) LASER BEAM ENERGY MODIFICATION TO REDUCE BACK-WALL STRIKES DURING LASER DRILLING

(71) Applicant: IPG PHOTONICS CORPORATION, Oxford, MA (US)

(72) Inventor: Steven R. Maynard, Dudley, MA (US)

(73) Assignee: IPG PHOTONICS CORPORATION, Oxford, MA (US)

( * ) Notice: Subject to any disclaimer, the term of this patent is extended or adjusted under 35 U.S.C. 154(b) by 323 days.

(21) Appl. No.: 15/580,931

(22) PCT Filed: Jun. 10, 2016

(86) PCT No.: PCT/US2016/036960
§ 371 (c)(1),
(2) Date: Dec. 8, 2017

(87) PCT Pub. No.: WO2016/201278
PCT Pub. Date: Dec. 15, 2016

(65) Prior Publication Data
US 2018/0161939 A1 Jun. 14, 2018

Related U.S. Application Data

(60) Provisional application No. 62/173,767, filed on Jun. 10, 2015.

(51) Int. Cl.
*B23K 26/382* (2014.01)
*B23K 26/073* (2006.01)

(52) U.S. Cl.
CPC .......... *B23K 26/382* (2015.10); *B23K 26/073* (2013.01); *B23K 26/0734* (2013.01)

(58) Field of Classification Search
CPC . B23K 26/382; B23K 26/073; B23K 26/0734
USPC ..................................... 219/121.71
See application file for complete search history.

(56) References Cited

U.S. PATENT DOCUMENTS

| | | | | |
|---|---|---|---|---|
| 5,227,098 A | * | 7/1993 | Philby | .............. B23K 26/18 264/267 |
| 6,515,257 B1 | * | 2/2003 | Jain | .............. B23K 26/067 219/121.73 |
| 2007/0140092 A1 | * | 6/2007 | Frangineas | ........ G02B 27/0927 369/112.18 |

* cited by examiner

*Primary Examiner* — Christine J Skubinna
(74) *Attorney, Agent, or Firm* — Timothy J. King, Esq.; Yuri B. Kateshov, Esq.

(57) ABSTRACT

Systems and methods for laser drilling provide laser beam energy modification to reduce (e.g., eliminate or minimize) back-wall strikes during laser drilling. The systems and methods modify the process laser beam energy such that a beam energy at a central region of the process laser beam is less than a beam energy at an outer region of the process laser beam. In one example, the modified process beam has zero beam energy at the central region, thereby providing a "donut mode." The laser beam energy modification may be achieved by detuning a fiber coupler in the Z axis such that laser energy is coupled into a cladding layer of the process fiber coupled to the laser fiber via the fiber coupler.

12 Claims, 4 Drawing Sheets

LASER BEAM ENERGY MODIFICATION TO REDUCE BACK-WALL STRIKES DURING LASER DRILLING

CROSS-REFERENCE TO RELATED APPLICATIONS

The present application claims the benefit of U.S. Patent Application Ser. No. 62/173,767 filed Jun. 10, 2015, which is fully incorporated herein by reference.

TECHNICAL FIELD

The present invention relates to laser drilling and more particularly, to laser beam energy modification to reduce back-wall strikes during laser drilling.

BACKGROUND INFORMATION

Lasers are used for a variety of machining operations including drilling. The laser may be directed and/or focused at the surface of a substrate until the laser energy melts or ablates the material to form a hole. In some drilling applications (e.g., in certain aerospace applications), the substrate being drilled is positioned in close proximity (e.g., less than ⅒ in.) to another substrate or structure. In such applications, back-wall strike by the laser after penetrating the substrate being drilled has always been a problem.

A conventional laser beam with a Gaussian distribution of laser energy becomes very hot at the center of the beam, which breaks through the substrate first. After the center of the beam breaks through, this hot central portion of the beam may cause damage to the back wall while the laser beam continues to drill the hole of the desired diameter. Some unsuccessful attempts at avoiding back-wall strike have included the use of cameras to monitor the drilling for determining when the laser penetrates the substrate being drilled.

SUMMARY OF THE DISCLOSURE

Consistent with an embodiment, a method is provided for laser drilling with modified laser energy distribution to reduce back-wall strike. The method includes: providing a substrate to be drilled proximate a back wall; generating laser light in a fiber laser; coupling the laser light from a feed fiber of the fiber laser to a process fiber, wherein the laser light is coupled into a cladding of the process fiber to modify the laser energy distribution to produce a laser beam output from the process fiber with a beam profile having a beam energy at a central region that is less than a beam energy at an outer region; and directing the modified laser beam from the process fiber to a substrate to be drilled until the modified laser beam forms a hole in the substrate.

Consistent with another embodiment, a laser drilling system is provided for modifying laser energy distribution to reduce back-wall strike. The laser drilling system includes a fiber laser including a feed fiber, a process fiber, and a fiber coupler coupling the feed fiber to the process fiber. The fiber coupler is detuned in the Z axis such that laser light from the feed fiber is coupled into a cladding of the process fiber to produce a laser beam output from the process fiber with a beam profile having a beam energy at a central region that is less than a beam energy at an outer region.

BRIEF DESCRIPTION OF THE DRAWINGS

These and other features and advantages will be better understood by reading the following detailed description, taken together with the drawings wherein.

DETAILED DESCRIPTION

Systems and methods for laser drilling, consistent with embodiments of the present disclosure, provide laser beam energy modification to reduce (e.g., eliminate or minimize) back-wall strikes during laser drilling. The systems and methods modify the process laser beam energy such that a beam energy at a central region of the process laser beam is less than a beam energy at an outer region of the process laser beam. In one example, the modified process beam has zero beam energy at the central region, thereby providing a "donut mode." The laser beam energy modification may be achieved by detuning a fiber coupler in the Z axis such that laser energy is coupled into a cladding layer of the process fiber coupled to the laser fiber via the fiber coupler.

Figures 1, 1A:
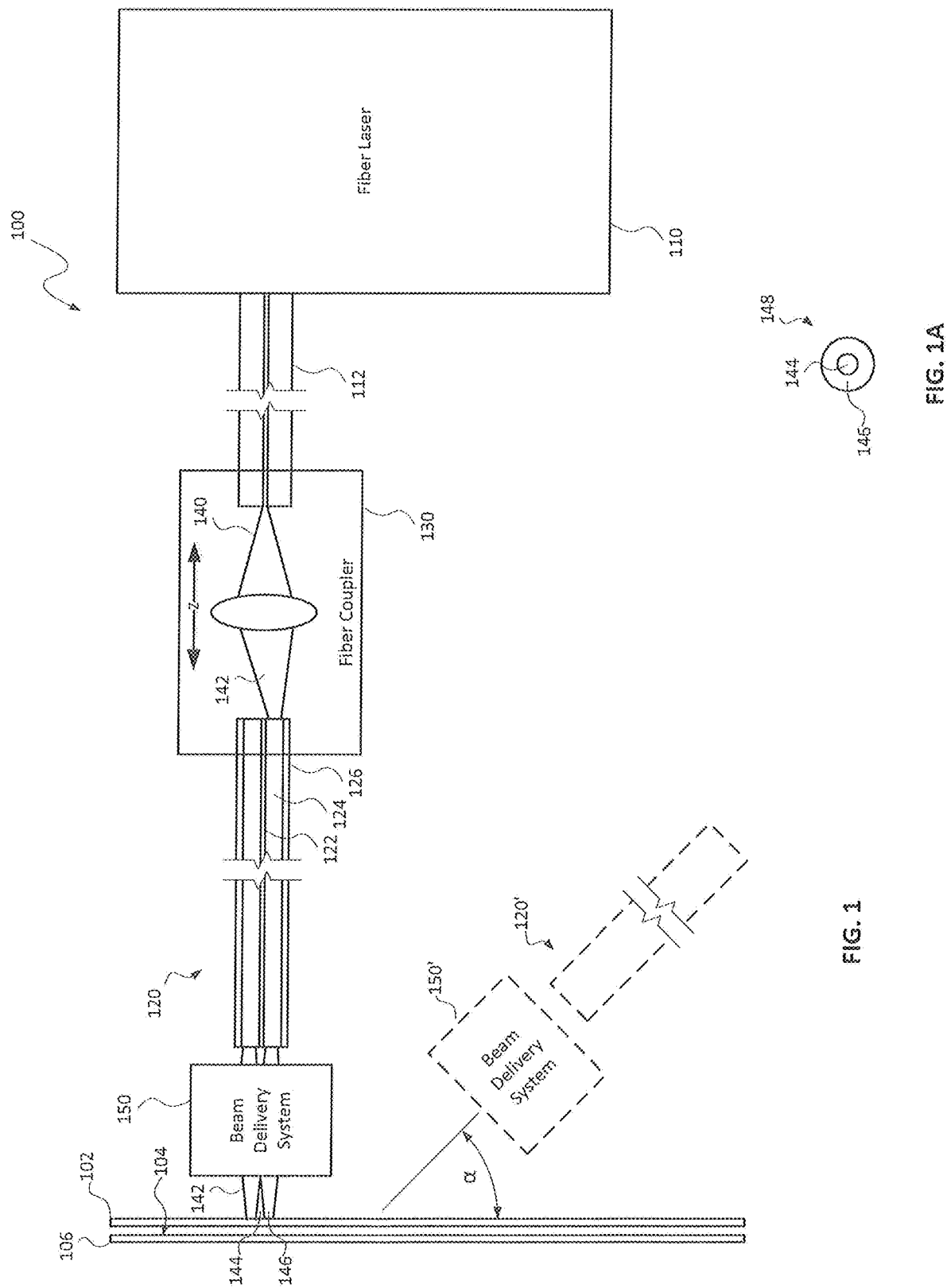
FIG. 1 is a schematic block diagram of a system for laser drilling with laser beam energy modification to reduce back-wall strikes, consistent with an embodiment of the present disclosure.
FIG. 1A illustrates a "donut" shaped beam profile of one example of a process laser beam with modified laser energy distribution produced by the system shown in FIG. 1.

Referring to FIG. 1, an embodiment of a system 100 for laser drilling with modified laser beam energy is shown schematically (i.e., not drawn to scale) and described in greater detail. The laser drilling system 100 may be used to drill one or more holes through a target substrate 102 positioned proximate a back wall 104 with reduced back-wall strikes of the process laser beam against the back wall 104 after drilling through the substrate 102. The back wall 104 may be provided on a back plate 106 or any other structure. The target substrate 102 may be in proximity to the back wall 104, for example, less than about ⅒ in. Back-wall strikes are less likely to occur the greater the spacing between the substrate 102 and the back wall 104.

The system 100 includes a fiber laser 110 with an output or feed fiber 112 coupled to a process fiber 120 via a fiber coupler 130. The process fiber 120 includes a core 122 and at least a first cladding 124. The cladding 124 may include a polymer with a lower index of refraction that allows light to be guided in the cladding 124. The process fiber 120 may also include a second cladding 126 over the first cladding 124. The ratio of clad/core diameters may be in a range from 10% to 100%.

The fiber coupler 130 couples the laser light 140 from the feed fiber 110 into the cladding 124 of the process fiber 120, which modifies the laser energy distribution of the process beam 142 output from the process fiber 120 such that a beam energy at the central region 144 is lower than a beam energy at the outer region 146 of the process beam 142. In one example, shown in greater detail in FIG. 1A, the beam energy at the central region 144 is zero resulting in a "donut" shaped beam profile 148. The beam energy at the central region 144 may also be simply a lower intensity relative to the beam energy at the outer region 146.

In this embodiment, the laser beam energy modification is achieved by detuning the fiber coupler 130 in the Z axis. The fiber coupler 130 may include fiber couplers available from IPG Photonics for coupling an output fiber from a fiber laser to a process fiber. These fiber couplers allow tuning by adjusting one or both of the fibers 110, 120 and/or the coupling optics in the Z axis (i.e., the beam axis). These fiber couplers are conventionally tuned to provide a Gaussian energy distribution across the beam profile but may be detuned to modify the laser energy distribution, as described herein. A beam analyzer (not shown) may be used to analyze the process beam 142 while detuning the fiber coupler 130 until the desired modified beam profile is achieved.

The system 100 may also include a beam delivery system 150 for delivering the process laser beam 142 to the target substrate 102. The beam delivery system 150 may include, for example, a collimator and/or a focus lens. In other embodiments, the process fiber 120' and the beam delivery system 150' may be angled to deliver the modified process beam at an angle α relative to a surface of the substrate 102 to drill angled holes in the substrate 102. The angle α may be in a range of about 20° to 90°.

The fiber laser 110 may be a quasi-continuous wave (QCW) fiber laser capable of longer pulses. In other embodiments, the system and method for laser drilling with laser beam energy modification to reduce back-wall strikes may use shorter pulse lasers or any other industrial laser. Although a drilling application is described herein, the system and method of modifying laser beam energy distribution may be used to prevent or reduce back-wall strike in other applications such as cutting or welding.

Figure 2:
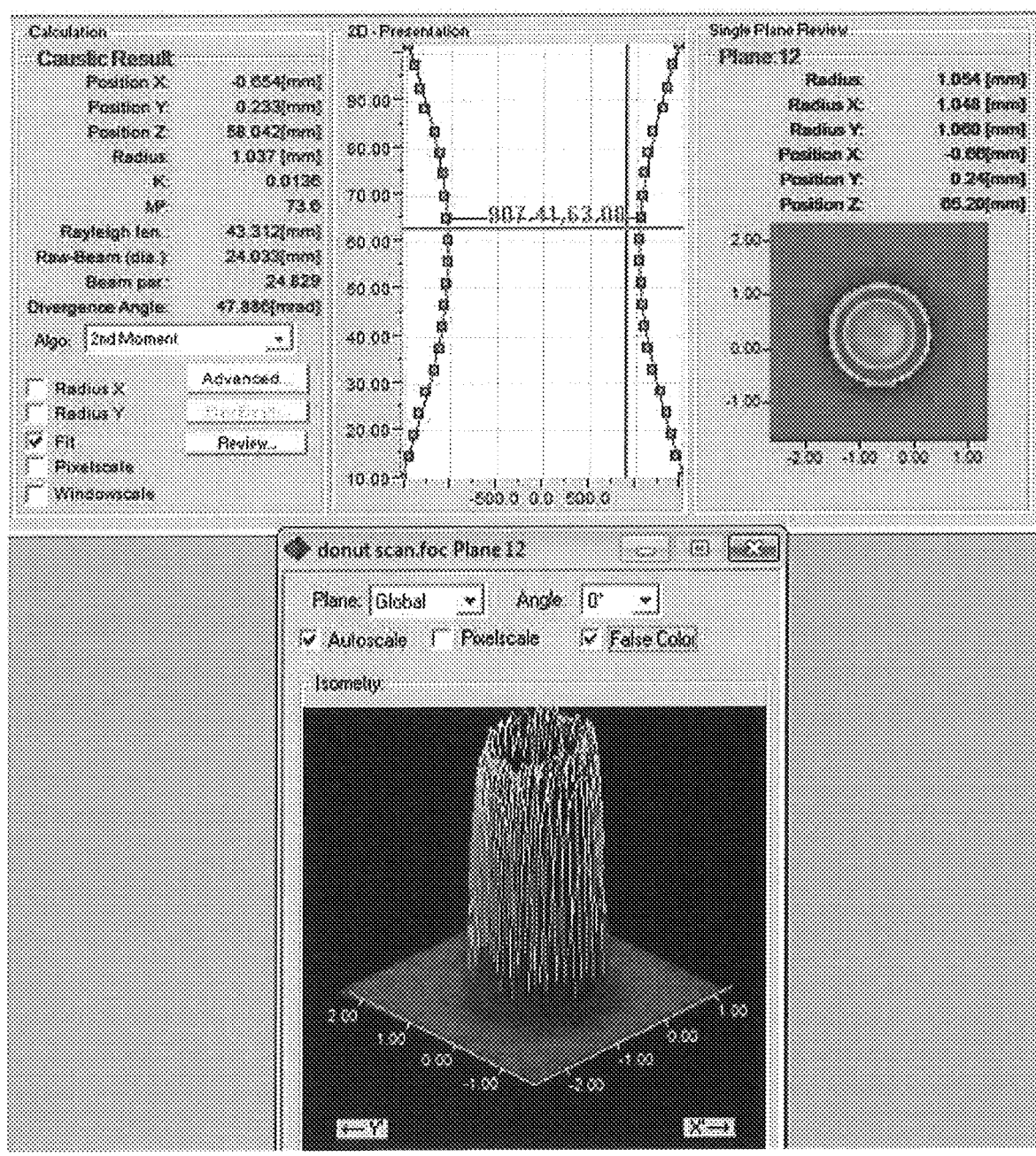
FIG. 2 illustrates the characteristics of a donut-shaped beam profile for one example of a process laser beam with modified laser energy distribution, consistent with an embodiment of the present disclosure.

FIG. 2 illustrates one example of the beam profile characteristics of a process beam with modified laser energy distribution. In this example, the beam energy at the central region is zero. In other examples, the beam energy at the central region may simply be lower than at the outer region.

Figure 3:
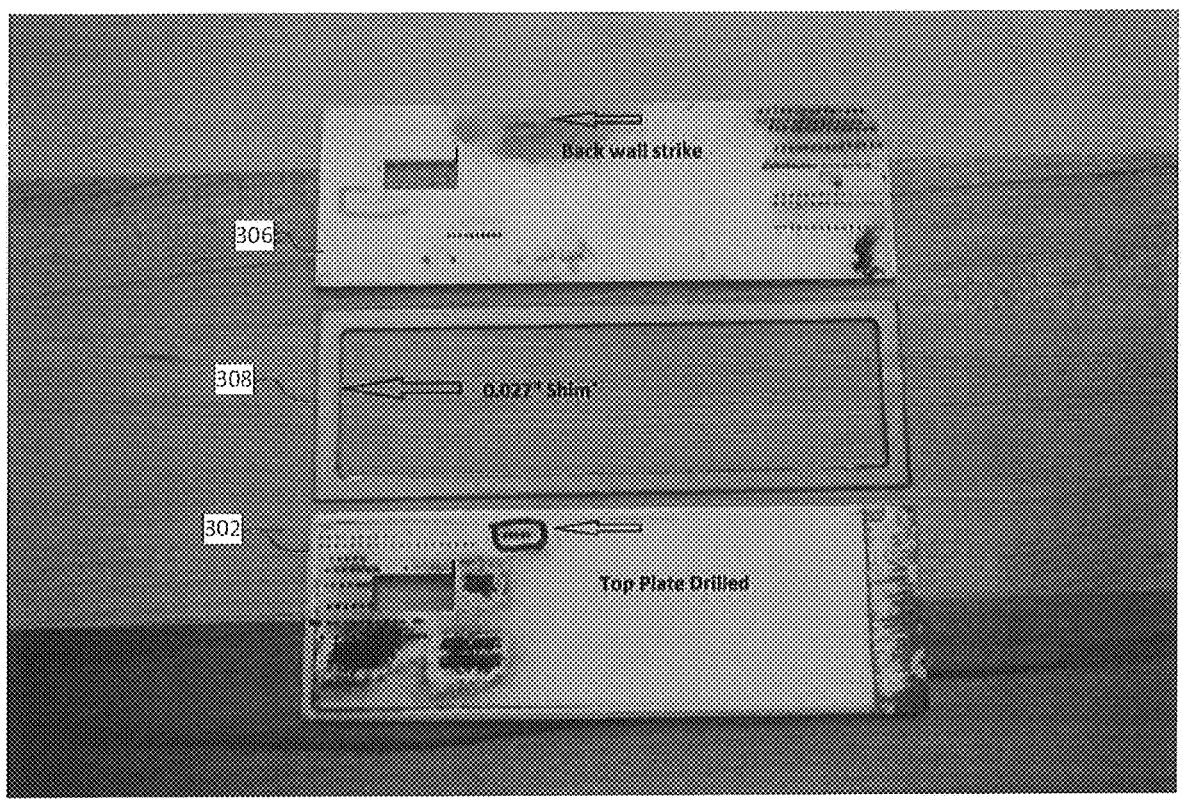
FIG. 3 is a photograph of a top plate to be drilled, a back plate and a shim to be positioned between the plates during laser drilling, consistent with an embodiment of the present disclosure.

FIG. 3 illustrates the materials used in one example of laser drilling according to the system and method described herein. In this example, the top plate 302 is drilled and is separated from a back plate 306 by a spacer or shim 308. The shim has a thickness of 0.027 in. and provides a corresponding spacing between the top plate 302 and the back plate 306 during drilling. The top plate 302 may be made of an austenite nickel-chromium-based superalloy, such as the type known as Inconel™, with a ceramic coating. In other examples, the top plate 302 and the back plate 306 may have other spacings or have no spacing. The top plate may also be made of other materials.

Figure 4A:
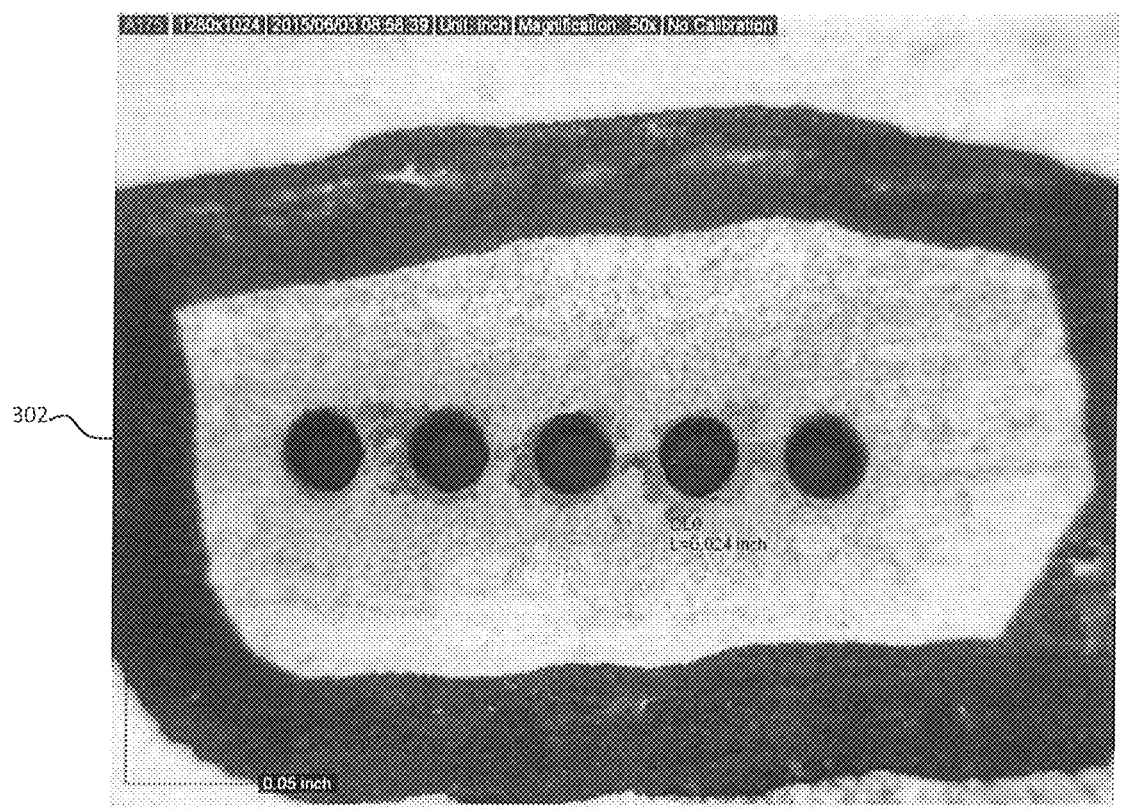
FIG. 4A is a micrograph of the holes drilled through the top plate using a laser with a donut-shaped beam profile, consistent with an embodiment of the present disclosure.
Figure 4B:
FIG. 4B is a micrograph of the back plate with reduced back-wall strike from drilling the holes shown in FIG. 4A.

FIGS. 4A and 4B illustrate the holes drilled in the top plate 302 and the back-wall strike against the back plate 306, respectively. In this example, the drilling is performed with a multi-mode ytterbium fiber laser at 1.07 micron wavelength, such as the YLS QCW 2000/20000 laser available from IPG Photonics. The holes were drilled normal to the surface of the top plate 302 with a single laser pulse having a duration of 5.5 ms at a 20 Kw peak power resulting in about 110 joules of beam energy. The holes are drilled with a diameter of 0.024 in. As shown, the holes were completely drilled with some minimal back-wall strikes on the back plate 306.

The laser energy used to drill the holes may vary depending on the material thickness and the angle of the process beam relative to the surface of the target substrate. As the material thickness increases, the delivered energy and the number of pulses delivered may be increased. In this example where 110 joules are used to create the hole, doubling the thickness of the material (e.g, by using a thicker plate or by angling the laser), the laser energy may be roughly doubled to create a hole through the greater thickness.

The laser parameters may also depend on the spacing between the substrate to be drilled and the back wall. In the above example with a 0.027 in. back wall spacing, the 5 millisecond pulse was sufficient to break through the top plate 302 but an additional 0.5 milliseconds was used to obtain the correct hole size, therefore impacting the back wall with the minimum amount to energy to obtain the correct hole diameter. Depending on the desired hole diameter and thickness, shorter pulses may be used. For the QCW laser in this example, pulse duration may range from sub-millisecond up to 10 milliseconds.

If the back wall is 0.5 in. or more from the target substrate, for example, the laser processing parameters may be more flexible because back-wall strike is less likely. At these larger spacings, for example, "clean-up" pulses may be used to improve taper and metallurgy with less chance of damaging the back wall. If the back wall spacing is less than 0.5 in., the parameters may be defined to minimize back-wall strike. For example, the pulse or pulses may be stopped immediately upon breakthrough.

The hole diameter may also change with the amount of energy delivered and the focal position. The optical configuration of a collimator and the focal length of the drilling lens may determine the hole diameter.

The systems, methods, and concepts described herein may be used with various lasers, fibers, fiber couplers and beam delivery systems to process various types of materials in various laser machining applications.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. A method of laser drilling with modified laser energy distribution to reduce back-wall strike, the method comprising
    providing a substrate to be drilled proximate a back wall;
    generating laser light in a fiber laser;
    coupling the laser light from a feed fiber of the fiber laser to a process fiber, wherein the laser light is coupled into a cladding of the process fiber to modify the laser energy distribution to produce a laser beam output from the process fiber with a beam profile having a beam energy at a central region that is less than a beam energy at an outer region; and
    directing the modified laser beam from the process fiber to a substrate to be drilled until the modified laser beam forms a hole in the substrate.

2. The method of claim 1 wherein coupling is performed using a fiber coupler that is detuned in the Z-axis.

3. The method of claim 1 wherein the beam energy at the central region is zero.

4. The method of claim 1 wherein the substrate to be drilled is less than 1/10 in. from the back wall.

5. The method of claim 1 wherein the process fiber includes a core and at least a first cladding, and wherein the laser light is coupled into the first cladding.

6. The method of claim 5 wherein the process fiber includes a second cladding around the first cladding.

7. The method of claim 1 wherein the process fiber includes a core and two or less claddings.

8. A laser drilling system for modifying laser energy distribution to reduce back-wall strike, the laser drilling system comprising:
   a fiber laser including a feed fiber;
   a process fiber; and
   a fiber coupler coupling the feed fiber to the process fiber, the fiber coupler being detuned in the Z axis such that laser light from the feed fiber is coupled into a cladding of the process fiber to produce a laser beam output from the process fiber with a beam profile having a beam energy at a central region that is less than a beam energy at an outer region.

9. The laser drilling system of claim 8 wherein the beam energy at the central region is zero.

10. The laser drilling system of claim 8 wherein the process fiber includes a core and at least a first cladding, and wherein the laser light is coupled into the first cladding.

11. The laser drilling system of claim 10 wherein the process fiber includes a second cladding around the first cladding.

12. The laser drilling system of claim 8 further comprising a beam delivery system for delivering the process laser beam from the process fiber to a target substrate to be drilled.

* * * * *